S. SHISLER.
CABLE TRACE.
APPLICATION FILED MAY 3, 1906.
No. 902,844.
Patented Nov. 3, 1908.
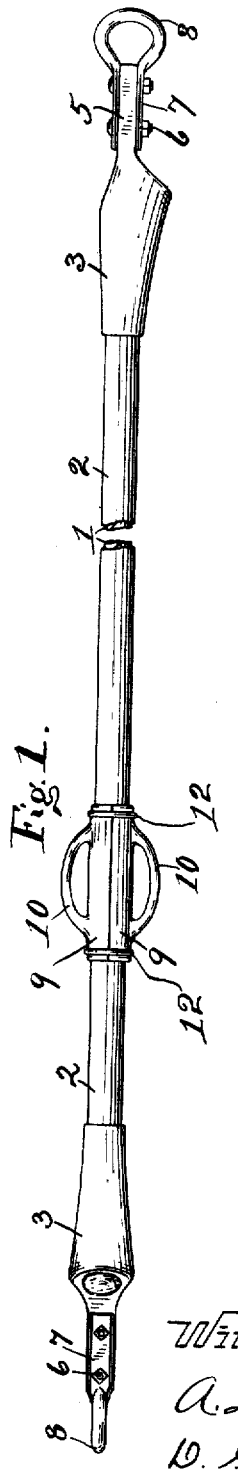
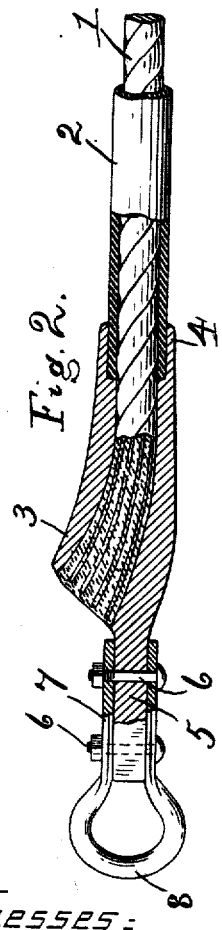
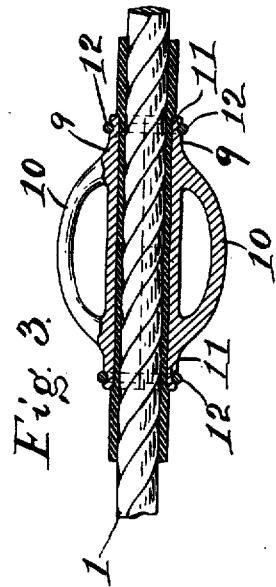
Witnesses:
A. L. Lord
D. Gutentag
Inventor.
Sherman Shisler,
by Bluford W. Brockett,
Attorney.
THE NORRIS PETERS CO., WASHINGTON, D. C.

UNITED STATES PATENT OFFICE.

SHERMAN SHISLER, OF CLEVELAND, OHIO.

CABLE-TRACE.

No. 902,844.  Specification of Letters Patent.  Patented Nov. 3, 1908.

Application filed May 3, 1906. Serial No. 314,982.

*To all whom it may concern:*

Be it known that I, SHERMAN SHISLER, residing at Cleveland, in the county of Cuyahoga and State of Ohio, have invented a certain new and useful Improvement in Cable-Traces, of which the following is a full, clear, and exact description, reference being had to the accompanying drawings.

This invention relates to traces generally and particularly to that class of such devices known as cable traces wherein an inner steel cable is rigidly secured in a socket which is provided with a tongue to which is secured a staple to be fastened to the hame or to the whiffletree. The cable has throughout its length a coating or covering of rubber for protecting it against the weather.

The invention also relates to a device or coupling which is rigidly clamped on the outside of the rubber casing in any desired position, and is provided with suitable loops or eyes to receive the back strap and the belly-band.

The invention may be further briefly described as consisting in the construction and combination of parts hereinafter set forth in the following description, drawings and claims.

Referring to the drawings, Figure 1 is a side elevation of a trace constructed according to my invention, Fig. 2 is a view of the trace end with the parts broken away to more clearly show their construction, and Fig. 3 is a sectional view of the coupling, for receiving the back strap and the belly-band.

Any preferred form and construction of parts may be employed in the carrying out of my invention, but I have shown one form in the drawings which very effectively meets the necessary requirements and in such embodiment 1 represents a cable of steel or the like which is preferably inclosed in a casing 2, of rubber or any other suitable material. The cable 1, is secured at each end in a socket 3, which has a ferrule 4, extending over the rubber casing and a tongue 5, provided with suitable openings for receiving the bolts 6. This tongue 5, fits nicely between the side members 7, of the staple 8, and these members are provided with suitable openings for receiving the bolts 6, whereby the staple may be rigidly secured to the tongue and thereby rigidly fastened to the cable also.

A removable coupling is provided for receiving the back-strap and the belly-band and this device consists of a pair of half round clamping members 9, which are provided with loops 10, for receiving the parts mentioned with annularly shaped recesses 11, which receive rings 12, for holding the clamping members 9, together. The rings 12, are small enough in diameter to require the clamping members 9, to be embedded in the rubber covering or casing before they will pass over the ends of such members into the recesses therein. From this construction it will be seen that there is small opportunity for the coupling device to slip endwise on the trace after it has been once adjusted.

Having described my invention, I claim:

1. A coupling device for cable traces, consisting of a pair of clamping members having half round recesses therein for the reception of the cable and each having a recess near each end thereof on the outside, means carried by said member for receiving the back strap and belly band, and suitable rings passing around said clamping members and engaging in recesses near the end thereof for holding them in any adjusted position.

2. A coupling device for incased cable traces, consisting of a pair of clamping members having half round grooves therein for the reception of the cable and also having annular recesses near their ends, and suitable binding rings adapted to engage in said recesses and cause the embedding of said members in the casing of the cable.

3. A coupling device for cable traces, consisting of a pair of clamping members having half round grooves in their meeting places for the reception of the cable and also having near their ends recesses, a fastening loop carried by one of said members, and rings engaging in said recesses for holding said clamping members in any adjusted position upon said cable.

In testimony whereof I affix my signature in the presence of two witnesses.

SHERMAN SHISLER.

Witnesses:
DELLA GUTENTAG,
B. W. BROCKETT.